United States Patent

[11] 3,610,944

| [72] | Inventors | Tsuneo Mitsui<br>Tokyo;<br>Jun-ichi Baba, Kobe; Ikuo Yamada, Kobe;<br>Hiromichi Kinoshita, Kobe, all of Japan |
|---|---|---|
| [21] | Appl. No. | 21,345 |
| [22] | Filed | Mar. 20, 1970 |
| [45] | Patented | Oct. 5, 1971 |
| [73] | Assignees | Tokyo Denryoku Kabushiki Kaisha<br>Tokyo, Japan;<br>Mitsubishi Denki Kabushiki Kaisha<br>Tokyo, Japan |
| [32] | Priority | Mar. 26, 1969 |
| [33] | | Japan |
| [31] | | 44/22899 |

[54] SYSTEM-INTERCONNECTING ARRANGEMENT
8 Claims, 3 Drawing Figs.

[52] U.S. Cl. .................................................. 307/17,
317/20, 323/45, 323/48
[51] Int. Cl. .................................................. H02j 3/06
[50] Field of Search .......................................... 307/17, 71,
77, 83; 323/45, 48; 317/20

[56] References Cited
UNITED STATES PATENTS

| 3,099,789 | 7/1963 | Perrins | 317/20 X |
| 3,179,876 | 4/1965 | Henman | 323/45 |
| 3,205,425 | 9/1965 | Moyer | 307/17 |
| 3,235,789 | 2/1966 | Naster | 323/45 |
| 3,263,158 | 7/1966 | Bargen et al. | 317/20 |
| 3,356,900 | 12/1967 | Kalkner | 317/20 |
| 3,356,901 | 12/1967 | Krämer | 317/20 |
| 3,418,532 | 12/1968 | Becker | 317/20 X |
| 3,474,327 | 10/1969 | Logan | 323/45 |

Primary Examiner—Robert K. Schaefer
Assistant Examiner—William J. Smith
Attorneys—Robert E. Burns and Emmanuel J. Lobato ABSTRACT: Two electric power systems are interconnected through primary windings of series transformers connected in parallel with each other. A shunt transformer is across the connecting series transformers and includes three windings of which two are connected across the secondary winding of each of the series transformers with a capacitor disposed between the secondary windings of both transformers. A thyristor is connected across the tertiary winding of the shunt transformer. The thyristor is in a closed condition to perform the normal interconnected system operation and assumes an opened condition upon the occurrence of a short circuit on either power system.

SYSTEM-INTERCONNECTING ARRANGEMENT

BACKGROUND OF THE INVENTION

The invention relates to an arrangement for interconnecting a pair of electric power systems.

It is well known that system-interconnecting arrangements are intended to incorporate a pair of electric power systems into a single unit to perform efficient system operation and are required to exhibit the following three functions:

1. The transmission of electric power between the pair of electric system is normally permitted with no obstacle which is called the free flow system-interconnecting function. This function is effective for placing the pair of electric power systems into a strongly interconnected system. To this end, the arrangement is required to have its impedance as low as possible;

2. Upon the occurrence of a short circuit failure on one of the electric power systems, the inrush of a short circuit current from the other or sound system into the short-circuited system should be instantaneously suppressed which is called the fault-current-limiting function. To this end, the arrangement is required to have its impedance as high as possible which, in turn, contradicts the requirement as above-described for the free flow system-interconnecting function; and 3. If one of the electric power systems is short of electric power required for supplying the associated loads (which is said to be unbalanced) the other electric system must apply a proper quantity of electric power to the system to relieve the unbalanced system. In that event if the other or sound system applies an excessive quantity of electric power to the unbalanced system the former previously sound system may become short of its required electric power resulting in a fear that power in both the electric systems will fall together. To avoid such power-falling failure together, it is required to regulate the relief power to a proper quantity which is called the relief-power-regulating function.

In order to exhibit the functions as above-described, it has been previously the practice to interpose a series transformer between a pair of electric power systems having a variable impedance device connected to the secondary winding thereof. The functions (1), (2) and (3) of the arrangement as above-described can be effectively exhibited only with the variable-impedance device meeting the following requirements:

I. As above-described, the system-interconnecting arrangements are required to be normally low in impedance. If the impedance of the series transformer is decreased below a certain magnitude then the transformer becomes very expensive and also difficult to be designed. This inhibits the series transformer from decreasing in impedance below a certain magnitude. This leads to the requirement that the variable impedance device have normally a capacitive impedance for the purpose of compensating for the impedance of the series transformer thereby to decrease the impedance of the arrangement;

II. Immediately after a short circuit failure has occurred on either one of both the electric systems, the interconnecting arrangement must increase in interconnecting impedance instantaneously after its occurrence, for example, within one cycle of the system current. This leads to the requirement that the variable impedance device be instantaneously changed from the capacitive to the inductive impedance; and III. Upon regulating the relief power, the interconnecting impedance of the arrangement is required to have a proper magnitude in accordance with the particular stream of the electric power flowing therethrough. This leads to the requirement that the variable-impedance device vary in response to a change in stream of electric power flowing therethrough.

SUMMARY OF THE INVENTION

Accordingly it is an object of the invention to put always a pair of electric power systems in smooth interconnected system operation.

It is another object of the invention to provide a new and improved system-interconnecting assembly formed of a plurality of system-interconnecting arrangements connected in parallel circuit relationship to increase reliability.

It is still another object of the invention to provide a system-interconnecting arrangement of the type as described in the preceding paragraph having a circuit breaker connected in series or parallel circuit relationship between both the electric power systems for operating them together or independently whenever it is desired to do so.

The invention accomplishes these objects by the provision of an arrangement for interconnecting a pair of electric power systems, comprising a series transformer connected between the electric power systems and having operatively coupled to a capacitor and switch means, characterized by a shunt transformer including a primary winding, a secondary winding and a tertiary winding, the primary and secondary windings connected in parallel circuit relationship to the secondary winding of the series transformer, the capacitor being connected to the secondary winding of the shunt transformer, and the switch means being connected across the tertiary winding of the shunt transformer.

Preferably the series transformer may have a circuit interrupter connected thereacross.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
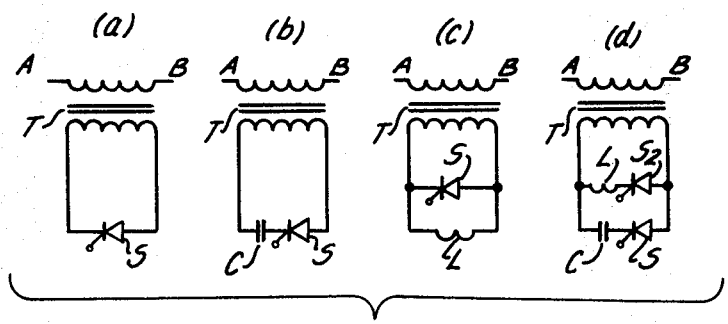
FIGS. 1a, b, c, and d are schematic circuit diagrams of system-interconnecting arrangements based upon the principles of the prior art.

Referring now to FIG. 1 of the drawings there are illustrated various forms of system-interconnecting arrangements based upon the principles of the prior art. A pair of electric power systems schematically designated by the reference characters A and B have connected there between a series transformer T. More specifically, the series transformer T includes a primary winding connected between the electric power systems A and B and a secondary winding having connected thereacross a semiconductor switch shown here as being thyristor S (See FIG. 1a), a series combination of a capacitor C and a switch or a thyristor S (see FIG. 1b), a parallel combination of a current limiting reactor L and a thyristor S (see FIG. 1c), or a series combination of a capacitor C and a thyristor $S_1$ connected across another series combination of a current-limiting reactor L and another thyristor $S_2$ (see FIG. 1d).

In FIG. 1a, the switch or thyristor S is normally in its closed position to interconnect the electrical power systems A and B through the leakage impedance of the series transformer T. Upon the occurrence of a short circuit failure on either one of the electric systems A or B, the thyristor S is brought into its open position to interconnect both the systems through the excitation impedance of the series transformer. This is true in the case of the relief-power regulation.

From FIG. 1a it will be seen that the impedance of the series transformer T in the normal interconnected system operation is set as a part of the above-mentioned requirement (I) and therefore it becomes high. Alternatively a decrease in impedance results in unduly high costs of the series transformer. Further the series transformer has a very high impedance appearing under the relief-power regulation and also an impedance much changed from the impedance during the normal interconnected system operation. This causes the transient stability of both systems to be adversely affected. In addition, since the impedance increases unduly easily the systems A and B are apt to be out of step.

In order to eliminate the above-mentioned disadvantages of the arrangements as shown in FIG. 1a the arrangements as illustrated in FIGS. 1b, c, and d have been proposed. In FIG. 1b, the switch or thyristor S has the capacitor C serially connected thereto whereby a capacitive impedance provided by the capacitor C is used to compensate for the impedance of the series transformer T when the switch S is in its closed condition. Therefore the arrangement has its impedance maintained at a low value. That is the first disadvantage of the arrangement as shown in FIG. 1a has been eliminated but the second disadvantage thereof is not yet eliminated.

FIG. 1c it is seen that the switch or thyristor S is connected in parallel circuit relationship to the current-limiting reactor L. The thyristor S is normally in its closed condition to short circuit the reactor in the normal operation but upon the occurrence of a short circuit failure or under the relief-power regulation, the thyristor S is in its open condition to utilize the sum of the impedance of the series transformer and that of the reactor to effect the current limination or the relief-power regulation as the case may be. Thus it will be understood that the arrangement of FIG. 1c eliminates the second disadvantage of the arrangement as shown in FIG. 1a but not the first disadvantage thereof.

The arrangement of FIG. 1d has the characteristic features of both the arrangements as shown in FIG. 1b and c. In FIG. 1d, the switch or thyristor $S_1$ is normally in its closed condition while the switch or thyristor $S_2$ is normally in its open condition whereby the operation as above-described in conjunction with FIG. 1b is performed.

On the other hand, upon the occurrence of a short circuit failure or under the relief-power regulation the switch $S_1$ is put in its open condition while the switch $S_2$ is put in its closed condition whereby the arrangement is caused to be operated in the similar manner as above-described in conjunction with FIG. 1c.

However, it is noted that the arrangement of FIG. 1d is disadvantageous in that the number of the components operatively coupled to the series transformer is doubled as compared with the arrangements shown in FIGS. 1a, b, and c resulting in high costs.

The invention contemplates to improve the arrangements as above-described in conjunction with FIGS. 1a, b, c and d. The principles of the invention will now be described with reference to FIG. 2 wherein like reference characters designate the components identical or corresponding to those shown in FIG. 1. As in FIG. 1, a pair of electric power systems A and B are interconnected through the primary winding of the series transformer T. The secondary winding of the series transformer T is connected at one end to a primary and a secondary winding of a controlling shunt transformer CT through a current-limiting reactor and a capacitor C respectively and at the other end to both windings. The shunt transformer CT includes, in addition to the primary and secondary windings disposed in parallel circuit relationship, a tertiary winding having connected thereacross a semiconductor switch shown here as being a thyristor S with the primary and secondary windings having a turns ratio of 1 to 1.

In the normal interconnected system operation, the switch S is in its open condition. Under these circumstances, a variable-impedance portion composed of the capacitor the reactor L and the shunt transformer CT has an equivalent impedance X expressed by $X=\frac{1}{2}(X_L-X_C)$ where $X_L$ represents the reactance of the reactor L and $-X_C$ represents the reactance of the capacitor C with neglecting small leakage impedances of the primary and secondary windings of the shunt transformer CT. If the capacitive impedance $X_C$ is chosen to be greater than the inductive impedance $X_L$ the impedance X is capacitive and therefore compensates for the impedance of the series transformer T thereby to decrease the impedance of the system interconnecting arrangement.

On the other hand, if a short circuit failure has occurred on either of the electric systems A or B or if both the systems are desired to be put under the relief-power regulation then the switch S is brought into its closed condition. Under these circumstances the variable impedance portion has its equivalent impedance X expressed by $X=(X_L X_C)/(X_C-X_L)$. Since the $X_C$ has been chosen to be greater than the $X_L$, the impedance X is inductive. Therefore the sum of that inductive impedance X and the impedance of the series transformer T serves to effect a fault current limitation or the relief-power regulation.

While the foregoing description has been made in conjunction with a single-phase power system it is to be understood that it is equally applicable to polyphase power systems.

Figure 2:
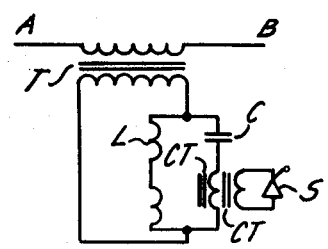
FIG. 2 is a schematic circuit diagram useful in explaining the principles of the invention.
Figure 3:
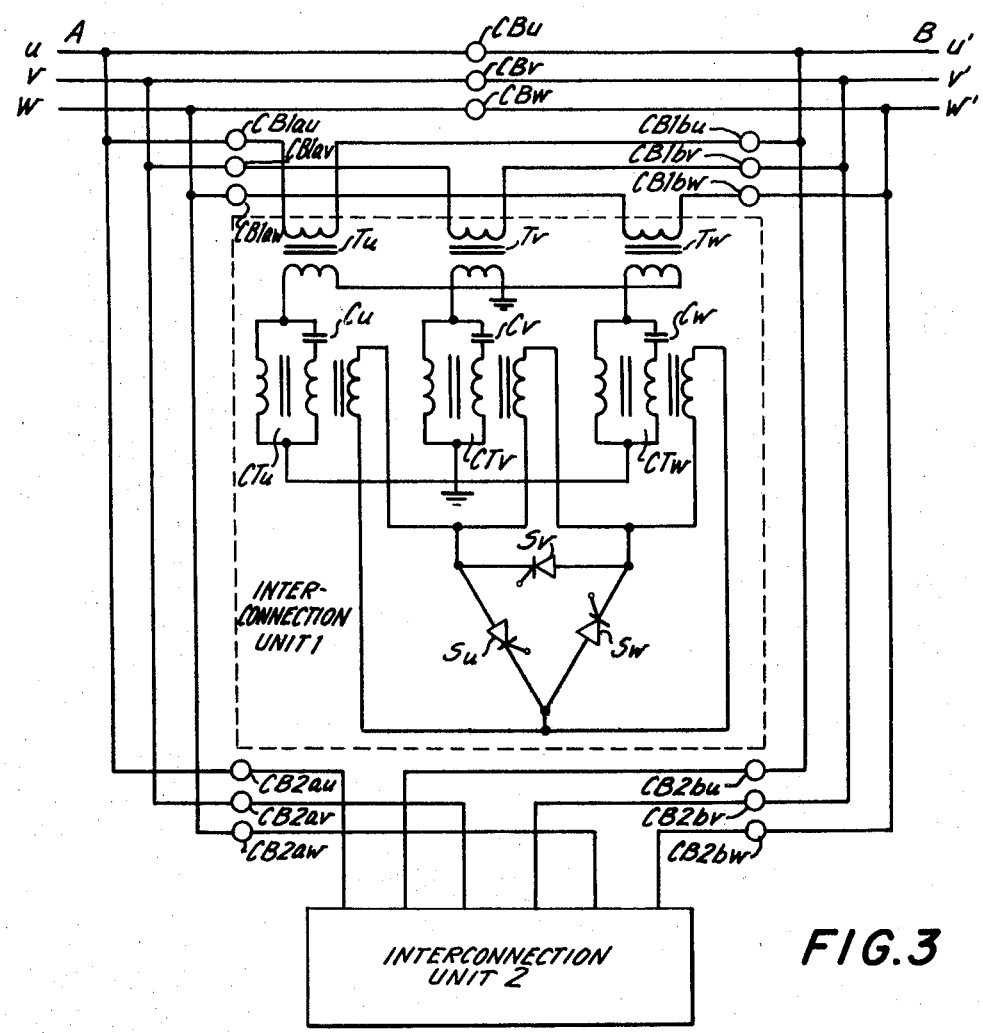
FIG. 3 is a circuit diagram of a system-interconnecting arrangement constructed in accordance with the principles of the invention.

Referring now to FIG. 3 there is illustrated one embodiment of the invention applied to a pair of three-phase power systems. As shown in FIG. 3, an electric power system A includes a phase $u$ connected to the corresponding phase $u$ of another electric power system B through a circuit breaker CB1au, a primary winding of a series transformer Tu and another circuit breaker CB1bu. The series transformer Tu includes its secondary winding connected at one end to a primary winding of a controlling shunt transformer CTu and also to a secondary winding thereof through a capacitor Cu. The shunt transformer CT includes a tertiary winding having connected thereacross a semiconductor switch shown here as being a thyristor Su. In other words, the phase $u$ of both the electric systems A and B are interconnected through the arrangement identical in construction and operation to that shown in FIG. 2 except for the omission of the reactor L shown in FIG. 2. In this event the reactor L is replaced by the leakage impedance of the primary winding of the shunt transformer CT.

The remaining phase $v$ and $w$ of the electric system A are connected to the corresponding phases of the electric system B in the same manner just described. Therefore the components associated with the system phase $v$ or $w$ are designated by the same reference characters denoting the identical components associated with the system phase $u$ with the suffix $v$ or $w$ rather than $u$ respectively. For example the reference character CTv denotes the shunt transformer for the phase $v$.

The secondary windings of the series transformers Tu, v and w are connected at the other ends together to ground and the switches Su, v and w are connected in the delta configuration Also both the electric systems A and B are interconnected directly through circuit breaker CBu, v and w adapted to interconnect the systems through an impedance of substantially zero and further they are interconnected through circuit CB2a, u, v, w and Cl2b, u, v and w and an interconnection unit schematically shown at dashed block 2 and identical in construction and operation to an interconnection unit 1 composed of the series transformers T, the shunt transformers CT and the switches S and above described. Thus the electric system A is connected to the electric system B through the two interconnection units 1 and 2 disposed in parallel circuit relationship whereby an impedance through which both the systems are interconnected is halved as compared with the use of the single interconnection unit 1 or 2.

The operation of the arrangement as shown in FIG. 3 will be readily understood from the description previously made in conjunction with FIG. 2 and need not be described in detail. It will be sufficient to be said that the circuit breaker CB1 and CB2 are normally in their closed condition. Upon the occurrence of any failure on either of the interconnection unit 1 and 2, the associated breakers can be brought into their open condition to disengage the failed unit from the electric systems while the latter continue to be interconnected through that unit which has not failed. Those circuit breakers have also the following function: If one of the electric systems, for example, the system B is short of its supply power due to the disconnection of the associated power source(s) from that system or to an abrupt increase in load, the systems are put under the relief-power regulation as previously described. However if the system B too is short of supply power to decrease the power flowing through the interconnection units even under the relief-power regulation, all the circuit breakers are brought into their open position to separate both the electric systems from each other thereby to prevent the interconnection units from having applied thereto any excessive voltage.

If both the electric systems A and B are out of step and become asynchronous the circuit interrupters CI1 and CI2 are normally brought to their open position to separate the systems A AND B from each other. However if the electric power is permitted to swing to a certain extent under an asynchronous state and if the interconnection units or system-interconnecting arrangement have or has a sufficient voltage rating then both the electric systems may continue to be in the system-interconnected system operation even in the out-of-step state with the circuit breakers CB1 and CB2 maintained in their closed position.

The invention has several advantages. For example, the variable-impedance means formed of a shunt transformer operatively associated with a capacitor and a semiconductor switch and connected across a secondary winding of a series transformer permits the interconnection impedance to be maintained at a low value in the normal interconnected system operation while increasing that impedance instantaneously in response to the occurrence of a short circuit failure on either of the interconnected systems. Further the relief-power regulation can be properly effected in accordance with a change in power flowing through the interconnection unit(s). Also since the primary and secondary windings of the shunt transformer have a turns ratio of 1 to 1. Current normally flowing through the capacitor is halved as compared with the arrangement as shown in FIG. 1b. Therefore, the capacitor can withstand an overload current of short duration flowing therethrough. Thus the capacitor can be more readily designed. This in turn is the case of the reactor L as shown in FIG. 2 because it is required only to have a normal capacity of current halved as compared with the reactor L as shown in FIG. 1c. It is noted that the reactor L as shown in FIG. 2 may be omitted through the utilization of the leakage reactance of the primary winding of the shunt transformer as shown in FIG. 3.

In addition, the impedance of the series transformer can be somewhat compensated for by the capacitive impedance as previously described. This permits the series transformer to have a some value of the impedance leading to the facilitation of transformer design.

Thus it will be appreciated that the invention satisfactorily perform its functions required for system interconnecting arrangements and is not expensive as compared with the conventional arrangements while facilitating the design.

While the invention has been illustrated and described in conjunction with a few preferred embodiments thereof it is to be understood that various changes and modifications may be resorted to without departing from the spirit and scope of the invention. For example, a single interconnection unit may be used provided that the reliability is permitted to be somewhat reduced. Alternatively more than two interconnection units may be used to increase the capability of the interconnecting arrangement. Also the invention is equally applicable to electric power systems having any desired number of phases. If desired the thyristor may replaced by any desired high-speed switching device.

What we claim is:

1. A system-interconnecting arrangement for interconnecting a pair of electric power systems comprising, a series transformer connected between two electric power systems, a shunt transformer including a primary winding, a secondary winding and a tertiary winding, said primary and secondary windings of said shunt transformer being connected in parallel circuit relationship to with the secondary winding of said series transformer, a capacitor connected to said secondary winding of said shunt transformer, and a switching device connected across said tertiary winding of said shunt transformer.

2. A system-interconnecting arrangement as claimed in claim 1, comprising a circuit breaker connected between said pair of electric power systems and in parallel circuit relationship with said series transformer.

3. A system-interconnecting arrangement as claimed in claim 1 comprising a circuit breaker connected between said pair of electric power systems in series circuit relationship with said series transformer.

4. A system-interconnecting arrangement as claimed in claim 1 comprising a reactor connected to said primary winding of said shunt transformer.

5. A system-interconnecting arrangement for interconnecting a pair of electric power systems, comprising a plurality of series transformers connected in parallel circuit relationship between two electric power systems, one shunt transformer for each series transformer including a primary winding, a secondary winding and a tertiary winding, said primary and secondary windings of said shunt transformer being connected in parallel circuit relationship with the secondary winding of said series transformer, a capacitor connected to said secondary winding of said shunt transformer and a switching device connected across said tertiary winding of said shunt transformer.

6. A system-interconnecting arrangement as claimed in claim 5, comprising a circuit breaker connected between said electric power systems and in parallel circuit relationship with said series transformer.

7. A system-interconnecting arrangement as claimed in claim 5 comprising a reactor connected to said primary winding of said shunt transformer.

8. A system-interconnecting arrangement as claimed in claim 5 comprising a circuit interrupter connected in series circuit relationship to each of said series transformers.